June 9, 1953 J. S. HASBROUCK 2,641,342
FLUID COUPLING AND CLUTCH
Filed March 28, 1950 2 Sheets-Sheet 2

INVENTOR
JOHN S. HASBROUCK
BY Charles A. Warren
ATTORNEY

Patented June 9, 1953

2,641,342

UNITED STATES PATENT OFFICE 2,641,342

FLUID COUPLING AND CLUTCH

John S. Hasbrouck, Glastonbury, Conn., assignor to United Aircraft Corporation, East Hartford, Conn., a corporation of Delaware Application March 28, 1950, Serial No. 152,368

3 Claims. (Cl. 192—3.2)

The present invention relates to a control system for a combined mechanical and hydraulic coupling especially adapted for connecting a power plant to a propeller system.

In gas turbine power plants adapted for driving a propeller or other energy utilizing device the gas turbine requires a high energy starter if the propeller is directly attached to the power plant. To unload the gas turbine, the propeller is coupled to the gas turbine after the latter is operating by means of a coupling including a hydraulic coupling for bringing the propeller up to speed and a positive mechanical coupling to provide the direct drive after the propeller has been brought to speed. To prevent accidental engagement of the mechanical drive before the driven device is up to speed it has been necessary for the operator to time the motion of the control valve. A feature of the present invention is an interlock which prevents the mechanical connection from being engaged before the hydraulic coupling is filled.

A propeller drive of this type is shown in the copending King application Serial No. 94,695 in which the control valve is moved by the operator through a predetermined angle to cause filling of the hydraulic coupling, and, after the hydraulic coupling is filled, the control valve is moved through a further angle in order to make operative the mechanical coupling. If through error the valve is moved suddenly through the complete angle available, the mechanical coupling may be damaged by an attempt to engage the gears while the propeller is still stationary. An object of the present invention is to prevent this difficulty from occurring by providing an automatic interlock such that the control valve may be moved in a single operation from inoperative to operative position.

Other objects and advantages will be apparent from the specification and claims, and from the accompanying drawings which illustrate an embodiment of the invention.

Figure 1:
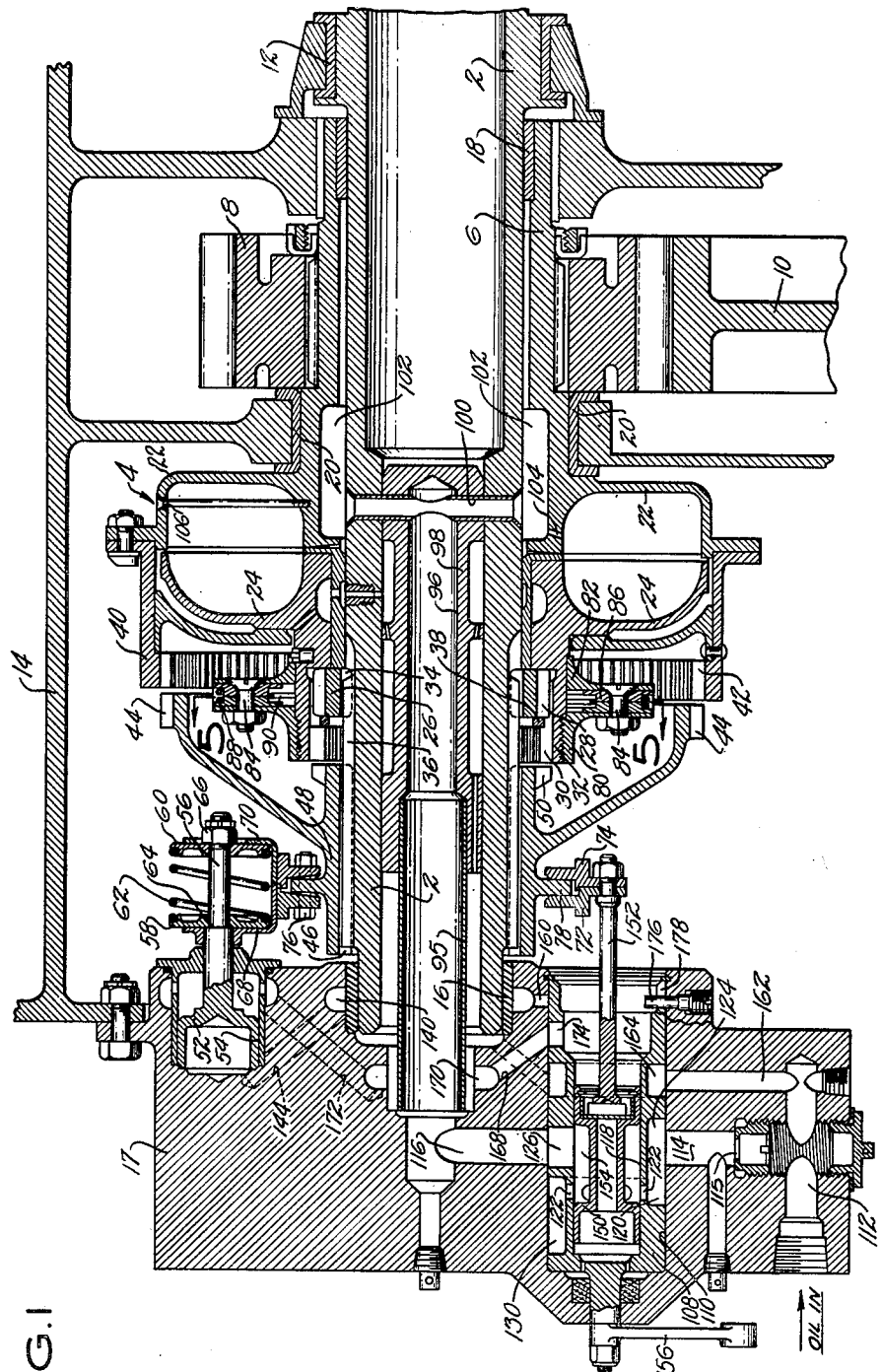
Fig. 1 is a sectional view through the driving system and the control device, the section being in part along line 1—1 of Fig. 2.

The invention is shown in a reduction gear shifting mechanism of the type disclosed and claimed in the copending King application Serial No. 94,695 above referred to in which a driving shaft 2 is connected through a hydraulic coupling 4 to a driven shaft 6. The shaft 6 may carry a gear 8 meshing with a gear 10 which may form a part of the drive system for a propeller.

The shaft 2 might be the extension shaft on a gas turbine power plant. The shaft 2 is journalled in a bearing 12 carried by a housing 14 and the opposite end of the shaft 2 is supported in a bearing 16 within an auxiliary housing 17 attached to the end of housing 14. The shaft 6 is rotatable on the shaft 2 being supported by spaced bearings 18 and being supported within the housing 14 on a bearing 20 between its ends.

The coupling 4 which forms a driving connection between the shafts 2 and 6 includes a runner 22 which in the arrangement shown is integral with the shaft 6 and an impeller 24 connected to the driving shaft 2 through a lockout ring 26. This ring has splines 28 on its outer surface engaging with splines 30 on a flange 32 integral with the impeller 24. On its inner surface the ring 26 has splines 34 (see also Fig. 5) engaging with cooperating splines 36 on the shaft 2. The splines 28 and 30 are loose splines to provide a limited circumferential movement between the ring and the surrounding flange 32. The lockout ring may be held in its axial position by a clamping ring 38.

The impeller 24 of the coupling is enclosed within a housing 40 bolted or otherwise secured to the runner 22 and having a ring gear 42 thereon adapted to mesh with a cooperating gear 44. The gear 44 is slideable on the shaft 2 having splines 46 within hub 48 engaging with the splines 36. The hub 48 of the gear 44 also has at its right-hand end a row of external splines 50 adapted to mesh with the splines 30 when there is no torque between the driving and driven shafts as will hereinafter appear. When the splines 50 mesh with the splines 30, the gear 44 is allowed to move to the right into engagement with the gear 42 and a direct mechanical drive between the shafts 2 and 6. The gear connection between the driving and driven shafts is thus in parallel relation to the fluid drive such that either drive may operate independently of the other.

The gear 44 is moved to the right into operative position, or retracted into the position shown, by hydraulically actuated means which includes a number of circumferentially spaced plungers 52 (only one being shown) axially slideable in cylinders 54 provided by the secondary housing 17. The plungers 52 have projecting rods 56 extending through caps 58 and 60 between which a spring 62 is positioned. The caps are free to move toward each other, as limited by the spring 62, and their movement apart on the rod 56 is limited by a shoulder 64 engaging with cap 58 and a nut 66 engaging with cap 60.

The caps 58 and 60 are positioned between spaced flanges 68 and 70 carried by rings 72 and 74 which may be held together as by bolts 76 in a position to engage the opposite sides of a flange 78 on the hub 48 of gear 44. Thus as the plungers 52 are urged to the right by fluid under pressure the force is transmitted to the flange 70 thereby urging it and the associated gear 44 to the right.

Figure 5:
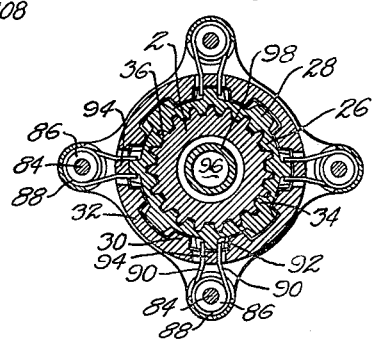
Fig. 5 is a sectional view on line 5—5 of Fig. 1 showing the lockout ring on a smaller scale.

As above stated the gear 44 is free to move into engagement with the gear 42 only if there is no torque being transmitted between the driving and driven shafts. A lockout mechanism by which this is accomplished is best shown in Figs. 1 and 5. Referring first to Fig. 1 the flange 32 on the impeller of the fluid coupling has mounted on its outer surface spaced supporting discs 80 and 82 both locked against rotation on the flange and both secured together at spaced points as by bolts 84. Each bolt has a surrounding sleeve 86 which supports a spring 88 having inwardly extending fingers 90 engaging in notches 92 provided in the side surfaces of the splines 28 and also engaging with lugs 94 provided by the flange 32. The springs tend to position the splines 28 centrally of the grooves between the cooperating splines 30 in such a way that the teeth 50 are in a position to mesh with the splines 30 to permit the gear 44 to be engaged with the gear 42. Whenever torque is applied between the driving and driven shafts, however, the ring 26 will be displaced circumferentially thereby misaligning the splines 30 and the splines 50 to prevent the gear 44 from meshing with the cooperating gear 42. When no torque is being transmitted, the springs 90 will move the splines 28 to central position such that the splines 50 may mesh with splines 30.

Hydraulic fluid for filling the coupling is admitted through a tube 95 forming an extension of an axial passage 96 in a plug 98 positioned within the shaft 2. A transverse passage 100 in the plug and shaft communicates with an annular groove 102 in the shaft 6 and fluid from this groove enters the hydraulic coupling through passages 104. Fluid discharges from the coupling through a bleed passage 106.

The admission of fluid to the coupling and also to the hydraulic actuating means for the gear 44 is under the control of a valve 108 in a bore 110 in the housing 17. Fluid is admitted to the bore 110 through an inlet passage 112 connected to a suitable source of fluid under pressure. The passage 112 intersects another passage 114 which intersects the bore 110 and which has a restricted orifice 115 therein to control the rate of flow to the bore 110.

The valve 108 provides fluid connection between the passage 114 and another passage 116 also in housing 17 which communicates with the end of the tube 95. To provide this fluid connection through the valve, the latter, which is in the form of a sleeve having an inner bore 118, has an annular groove 120 in its outer surface communicating with the bore through a number of openings 122. A notch 124 in the outer surface of the valve provides fluid connection from the inlet passage 114 to the annular groove 120 and a radial port 126 communicates with the passage 116 when the valve is in the annular position shown in Fig. 1.

Figure 2:
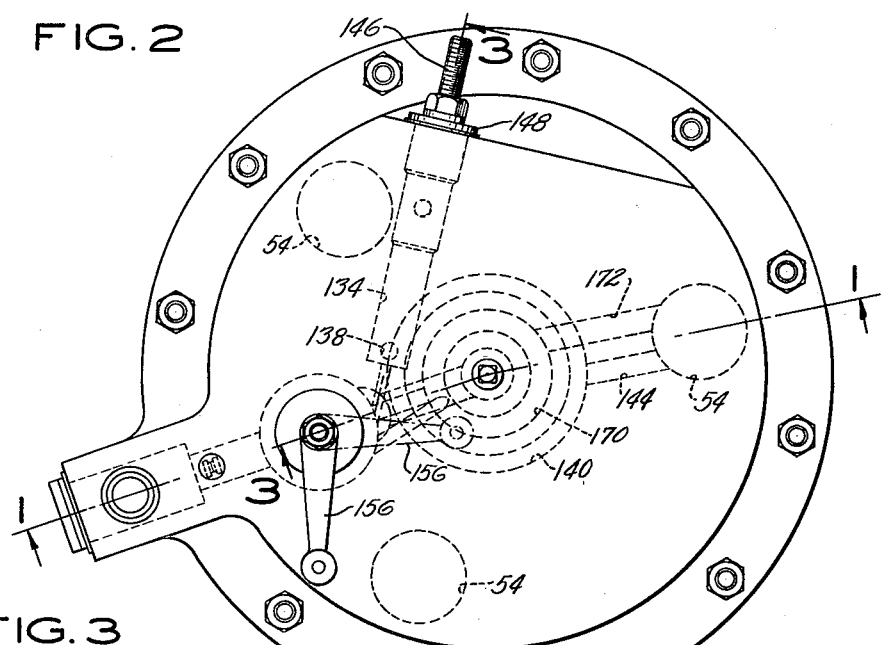
Fig. 2 is an end view of the device of Fig. 1.
Figure 3:
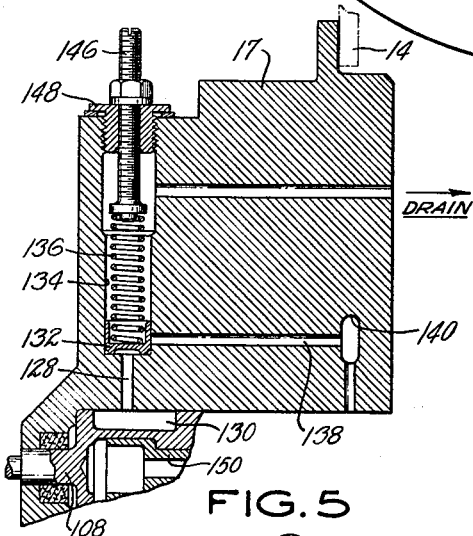
Fig. 3 is a sectional view along the line 3—3 of Fig. 2.

Fluid is also admitted through the same annular groove 120 to the left-hand ends of the cylinders 54 for shifting the gear 44 into engaging position. To accomplish this the housing 17 has a passage 128, Fig. 3, communicating with the bore 110 and in a position to be uncovered by a notch 130 provided in the outer surface of the valve and intersecting the groove 120. The outer end of the passage 128 is closed by a check valve 132 slideable in a bore 134 and held in closed position by a spring 136. A passage 138 also in housing 17 extends between the bore 134 and a groove 140 which extends around the bearing sleeve 16, the latter forming one of the bearing surfaces for the shaft 2. Angularly spaced from the passage 138 is another passage 144, Fig. 1, between the groove 140 and the left-hand end of the cylinder 54. As shown in Fig. 2, which shows a plurality of cylinders 54, it is obvious that a similar passage 144 extends to each of the cylinders. The tension of the spring 136 may be adjusted by a rod 146 which engages the end of the spring and is turnable in a threaded collar 148 in the end of bore 134.

The tension of the spring is adjusted so that the valve 132 will open at a pressure slightly below the inlet fluid pressure. The passages forming the inlet 112 to the hydraulic coupling are made relatively large so that the flow is restricted very little and the passage 128 is made relatively small to provide a considerable restriction. When the valve 108 is moved into the open position shown in Fig. 1 the fluid flows readily into the coupling with a resultant drop in pressure around the valve 108 as a result of the restricted orifice 115 so that the pressure around the valve is reduced to a value lower than the setting of the spring for valve 132. This valve accordingly remains closed until the coupling is filled and the pressure around the valve is again raised substantially to the fluid inlet pressure. The coupling will then be in operation with torque being transmitted between the driving and driven shafts and the admission of fluid to the gear actuating cylinders will not cause inadvertent meshing of the gear 42 and 44 since the lockout device above described will be operative. The check valve 132 therefore functions as a time delay device which prevents the cylinders 54 from receiving actuating fluid until the coupling is filled.

The device is adapted to cut off the supply of fluid to the coupling when the gears 42 and 44 are moved into operative engagement. For this purpose the valve bore 118 receives an axially slideable plunger 150 which is connected by a rod 152 to the rings 72 and 74 located on opposite sides of the flange 78 on the hub of the gear 44. The plunger has a centrally located groove 154 in its periphery which normally provides fluid connection between the openings 122 and the passage 126. When the gears 42 and 44 intermesh, however, the full diameter end of the plunger 150 closes the openings 122 thereby preventing the admission of any more fluid to the coupling. The coupling will then empty within a short time through the bleed passages 106.

Figure 4:
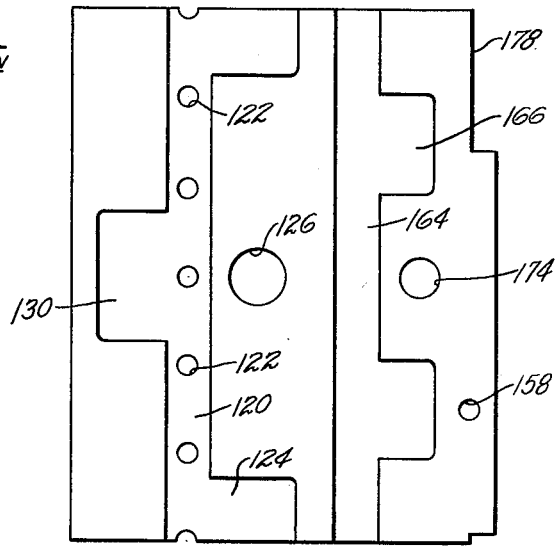
Fig. 4 is a developed view of the control valve.

The valve 108 has a control arm 156 by which the valve is turned for the purpose of causing engagement of the gears 42 and 44 or for causing disengagement. With the arm in the position shown, fluid under pressure is admitted as above described to the left-hand ends of the cylinders 54 for engaging the gears. For retracting the gear 44 the control arm 156 is moved through an angle of 90° into the dot-dash line position of Fig. 2. When this is done the port 126 is moved out of alignment with the passage 116 thereby cutting off the supply of fluid to the hydraulic coupling. At the same time a port 158, Fig. 4, in the valve is moved into alignment with a passage 160, the latter intersecting the groove 140 by which the fluid is admitted to the left-hand ends of the cylinders 54, thus opening the left-hand side of the pistons to drain.

Also when the valve is turned, fluid under pressure through a passage 162 flows around a groove 164 in the valve and in a transverse groove 166 to a passage 168 in the housing 17. This passage intersects a groove 170 which in turn communicates with a passage 172 to the right-hand end of the cylinder 52. Thus with the valve in the shut-off position, fluid under pressure is admitted to the right-hand ends of the cylinders thereby retracting the gear 44. A port 174 in the valve is in a position to be aligned with the passage 168 when the valve 108 is in a position for causing engagement of the gears 42 and 44 thereby venting the right-hand end of the cylinders.

The valve is located in its two positions by a pin 176 in the housing 17, this pin engaging in a slot 178 in the valve.

In operation, when the control arm 156 of the valve 108 is moved into the full line position shown, fluid under pressure is admitted through the port 126 to the hydraulic coupling. As above stated the flow passages are large enough to produce practically no restriction so that the resulting pressure in groove 120 is too low to lift the valve 132. Thus the hydraulic coupling is filled and the driven shaft 6 begins to rotate before any actuating fluid reaches the cylinders 54. As soon as torque is transmitted between the driving and driven shafts the lockout ring 26 has misaligned the teeth 30 with the cooperating teeth 50 thereby preventing the gears 42 and 44 from engaging. As the coupling fills with fluid, pressure is built up in the groove 120 to an amount sufficient to lift the valve 132 and admit fluid under pressure to the left-hand ends of the cylinders 54. This pressure urges the pistons to the right thereby attempting to engage the gears 42 and 44. After the coupling has brought the driven shaft approximately up to speed the speed of the driving shaft is momentarily reduced such that there will be no torque transmitted between the shafts thereby allowing the springs 89 to centralize the splines 28 with respect to the cooperating splines 30 such that the splines 50 may fit within the splines 30 and allow the gears 42 and 44 to mesh.

For disengaging the gears the control arm 156 is moved to the dot-dash line position thereby cutting off the supply of fluid through the port 126 to the coupling and also connecting the left-hand end of the cylinders 54 to drain through the port 158. At the same time fluid under pressure through the groove 166 enters the right-hand end of the cylinders thereby retracting the pistons which carry the gear 44 into the inoperative position shown.

The shafts 2 and 6 have been referred to as the driving and driven shafts respectively. It should be understood that, as the device is shown the drive might be in the opposite direction with the shaft 6 being the driving shaft and operating to drive the shaft 2. The coupling device will act equally well in either case.

It is to be understood that the invention is not limited to the specific embodiment herein illustrated and described, but may be used in other ways without departure from its spirit as defined by the following claims.

I claim:

1. In a power transmission, a driving member, a driven member, a fluid coupling for connecting said members, a mechanical connection including intermeshing gears for connecting said members in parallel relation to the fluid coupling, one of said gears being movable into and out of mesh with the other gear, lock-out means to prevent meshing of the gears when the coupling is transmitting torque, spring means rendering said lock-out inoperative when substantially no torque is transmitted by the coupling, hydraulically actuated means for moving said movable gear into operative position, valve means for admitting fluid to said coupling and to said hydraulically actuated means, and a time delay device between said valve and said hydraulically actuated means to delay the actuation of said means until the coupling is in operation, said time delay device including a resiliently closed valve between the first valve and the hydraulically actuated means and controlling the flow of pressure fluid to the hydraulically actuated means, said valve being openable by pressure only when the coupling has been filled.

2. In a power transmission, a driving shaft, a driven shaft, intermeshing cooperating gears interconnecting said shafts, one of said gears being movable relative to the other for disengaging said gears, lock-out means to prevent meshing of the gears when the coupling is transmitting torque, spring means rendering said lock-out inoperative when substantially no torque is transmitted by the coupling, hydraulically actuated means for moving said movable gear, a fluid coupling for connecting said shafts in parallelism with said gears, a manually controlled valve for admitting fluid under pressure to said coupling and to said hydraulically actuated means, a restriction in the inlet to said valve and a pressure responsive valve in the fluid connection to said hydraulically actuated means for admitting fluid to said means only when a predetermined pressure is reached in the connection from the manually controlled valve to said pressure responsive valve, said pressure responsive valve being set to open at a pressure higher than the pressure of the fluid in said valve during filling of the coupling.

3. In a power transmission, a driving shaft, a driven shaft, intermeshing cooperating gears interconnecting said shafts, one of said gears being movable relative to the other for disengaging said gears, hydraulically actuated means for moving said movable gear, a fluid coupling for connecting said shafts in parallelism with said gears, lock-out means to prevent meshing of the gears when the coupling is transmitting torque, spring means rendering said lock-out inoperative when substantially no torque is transmitted by the coupling, a manually controlled valve for admitting fluid to said coupling and to said hydraulically actuated means, and a pressure responsive valve between said manual valve and said hydraulically actuated means for admitting fluid to said means only at a predetermined fluid pressure.

JOHN S. HASBROUCK.

References Cited in the file of this patent

UNITED STATES PATENTS

| Number | Name | Date |
|---|---|---|
| 2,045,615 | Rosle et al. | June 30, 1936 |
| 2,351,483 | Carnagua | June 13, 1944 |
| 2,417,566 | Polomski | Mar. 18, 1947 |
| 2,418,838 | Huebner | Apr. 15, 1947 |
| 2,421,501 | Hasbrouck | June 3, 1947 |